United States Patent
Knoll et al.

(10) Patent No.: US 9,187,379 B2
(45) Date of Patent: Nov. 17, 2015

(54) CONVERSION OF ACID GAS TO SULPHATE OR PHOSPHATE-BASED FERTILIZERS

(75) Inventors: Rick Knoll, Calgary (CA); Eric Pedersen, Calgary (CA); Satish Iyer, Calgary (CA)

(73) Assignee: Sulvaris Inc., Calgary, Alberta (CA)

( * ) Notice: Subject to any disclaimer, the term of this patent is extended or adjusted under 35 U.S.C. 154(b) by 0 days.

(21) Appl. No.: 14/110,834

(22) PCT Filed: Apr. 20, 2012

(86) PCT No.: PCT/CA2012/000377
§ 371 (c)(1),
(2), (4) Date: Oct. 9, 2013

(87) PCT Pub. No.: WO2012/142704
PCT Pub. Date: Oct. 26, 2012

(65) Prior Publication Data
US 2014/0033778 A1    Feb. 6, 2014

(30) Foreign Application Priority Data
Apr. 20, 2011  (CA) .................................... 2737825

(51) Int. Cl.
C05D 9/00       (2006.01)
C05D 9/02       (2006.01)
(Continued)

(52) U.S. Cl.
CPC .............. C05B 17/02 (2013.01); B01D 53/52 (2013.01); C01B 17/50 (2013.01); C01B 17/76 (2013.01);
(Continued)

(58) Field of Classification Search
USPC .......... 423/522, 542, 157.4; 48/197 R; 71/63, 71/34
See application file for complete search history.

(56) References Cited

U.S. PATENT DOCUMENTS 2,003,442 A   6/1935   Hechenbleikner et al.
2,067,311 A   1/1937   Baehr
(Continued)

FOREIGN PATENT DOCUMENTS

CN    101516497    3/2009
CN    101618863    1/2010
(Continued)

OTHER PUBLICATIONS

Anonymous: Best Available Techniques for Pollution Prevention and Control in the European Sulphuric Acid and Fertilizer Industries. Production of Sulphuric Acid 2000 European Sulphuric Acid Association (ESA) A sector group of CEFIC EFMA European Fertilizer Manufacturer's Association. Jan. 1, 2000, Retrieved from the Internet: http://www.productstewardship.eu/fileadmin/user_upload/user_upload_prodstew/documents/Booklet_nr_3_Productionof_Sulphuric Acid.pdf.
(Continued)

Primary Examiner — Wayne Langel
(74) Attorney, Agent, or Firm — Bennett Jones LLP

(57) ABSTRACT

A method is disclosed for producing sulphate or phosphate-based fertilizer from hydrogen sulphide. The method involves feeding a stream containing a substantial volume of hydrogen sulphide and air to a furnace, where it is burned to produce a sulphur dioxide rich gas stream. The sulphur dioxide rich gas stream is then fed to a reactor to produce a sulphuric acid stream and a waste stream comprising carbon dioxide, nitrogen, oxygen, trace impurities and trace amounts of unreacted sulphur dioxide. The sulphuric acid stream is finally converted to a sulphate or phosphate-based fertilizer.

13 Claims, 3 Drawing Sheets

(51) Int. Cl.
    *C05B 3/00*     (2006.01)
    *C05B 7/00*     (2006.01)
    *C05B 17/00*     (2006.01)
    *C01B 17/765*     (2006.01)
    *C01B 17/50*     (2006.01)
    *C05B 17/02*     (2006.01)
    *C05D 1/02*     (2006.01)
    *C01C 1/242*     (2006.01)
    *C01B 17/76*     (2006.01)
    *C01B 17/96*     (2006.01)
    *C01F 11/46*     (2006.01)
    *B01D 53/52*     (2006.01)
    *C01B 25/28*     (2006.01)
    *C05C 3/00*     (2006.01)

(52) U.S. Cl.
    CPC ............ *C01B 17/7655* (2013.01); *C01B 17/96* (2013.01); *C01B 25/28* (2013.01); *C01C 1/242* (2013.01); *C01F 11/46* (2013.01); *C05B 3/00* (2013.01); *C05B 7/00* (2013.01); *C05B 17/00* (2013.01); *C05C 3/00* (2013.01); *C05C 3/005* (2013.01); *C05D 1/02* (2013.01); *C05D 9/00* (2013.01); *B01D 2251/11* (2013.01); *B01D 2257/304* (2013.01); *C05D 9/02* (2013.01)

(56) References Cited

U.S. PATENT DOCUMENTS

| | | | | |
|---|---|---|---|---|
| 2,856,278 A * | 10/1958 | Bray et al. | .................. | 71/25 |
| 2,976,138 A * | 3/1961 | Hester | .................. | 71/1 |
| 3,172,725 A * | 3/1965 | Rugh | .................. | 423/531 |
| 3,975,168 A * | 8/1976 | Gorbaty | .................. | 48/197 R |
| 3,998,935 A * | 12/1976 | Adams et al. | .................. | 423/552 |
| 4,045,543 A * | 8/1977 | Sardisco | .................. | 423/482 |
| 4,436,710 A * | 3/1984 | Miyazaki et al. | .................. | 423/552 |
| 4,576,814 A * | 3/1986 | Hass et al. | .................. | 423/575 |
| 4,588,573 A * | 5/1986 | Worthington et al. | .................. | 423/552 |
| 4,744,969 A * | 5/1988 | Marten et al. | .................. | 423/541.1 |
| 4,963,513 A * | 10/1990 | Marten | .................. | 48/210 |
| 5,383,951 A * | 1/1995 | Cross et al. | .................. | 71/61 |
| 6,210,459 B1 * | 4/2001 | Sanders | .................. | 71/61 |
| 6,315,976 B1 * | 11/2001 | Phinney | .................. | 423/551 |
| 6,372,008 B1 * | 4/2002 | Boote et al. | .................. | 71/63 |
| 6,562,308 B1 * | 5/2003 | Carstens et al. | .................. | 423/157.3 |
| 7,258,848 B1 | 8/2007 | Blackwell et al. | | |
| 8,057,569 B2 * | 11/2011 | Burnham et al. | .................. | 71/11 |
| 8,198,211 B2 | 6/2012 | Johnson et al. | | |
| 2002/0114759 A1 * | 8/2002 | Cabello-Fuentes | .................. | 423/482 |
| 2011/0214465 A1 * | 9/2011 | Peacock et al. | .................. | 71/28 |

FOREIGN PATENT DOCUMENTS

| | | |
|---|---|---|
| JP | 2003253275 | 9/2003 |
| RU | 2087414 | 8/1997 |
| WO | WO2008022461 | 8/2007 |
| WO | 2011/067045 | 6/2011 |
| WO | 2012142704 | 10/2012 |

OTHER PUBLICATIONS

Laursen Jens K. et al. WSA—Meeting industry demands. Sep. 1, 2007. Retrieved from the Internet: http://www.topsoe.com/sites/default/files/topsoe_wsa_meet_industry_demans.ashx_3.pdf.

* cited by examiner

CONVERSION OF ACID GAS TO SULPHATE OR PHOSPHATE-BASED FERTILIZERS

FIELD OF THE INVENTION

The present invention relates to a method of producing sulphate-based and phosphate-based fertilizers from an acid gas stream consisting of hydrogen sulphide gas The sulphur component of the acid gas stream is ultimately converted to a useful fertilizer with commercial value.

BACKGROUND

Natural gas streams produced from some subterranean formations frequently contain substantial volumes of various acid gas fractions such as hydrogen sulphide ($H_2S$), carbon dioxide ($CO_2$) and the like. The natural gas, commonly referred to as "sour gas", must be purified and the acid gas fractions removed before being sent to market. The process of removal of these acid gas fractions is referred to in the industry as "sweetening" the sour natural gas stream.

There are various methods for sweetening sour gas to remove acid gas fractions therefrom. One of the most common methods has been to recover those acid gas fractions from the natural gas stream and to process it in a plant to produce elemental sulphur or, alternatively, inject it into well spaces below the ground. Such practices are very expensive with almost no monetary returns or gains. Beyond the cost associated with this type of method, there are negative environmental impacts on a number of levels.

The safe handling of sour gas and the removal of acid gas fractions therefrom is a significant economic factor in the feasibility of certain hydrocarbon recovery projects. In cases where it has been desired in the past to remove hydrogen sulphide and other acid gas fractions from a natural gas stream for example, solvent absorption methods have been practiced in the past whereby the gas stream from the well site is conveyed to a central processing facility where the hydrogen sulphide or other identified non-desirable acid gas fractions are removed by solvent absorption or other similar techniques.

Another source of by-product $H_2S$ is from the gasification of coal. Gasification is a process by which coal or other low-value carbonaceous solid fuels are gasified in a large chemical reactor. The resulting synthesis gas (syngas) comprises mostly hydrogen and carbon monoxide, and conventionally is cleansed and then used to fire an electric power plant. Syngas may also be converted into high value products such as synthetic fuels or ammonia. Several by-product streams are generated during gasification, including a stream of hydrogen sulphide gas.

There has been little effort made to produce an economically valuable product from by-product hydrogen sulphide gas. Sulphuric acid is one such valuable product that could be further produced from hydrogen sulphide that is recovered from acid gas waste streams of hydrocarbon processing. Several commercially established techniques are available in the market to convert hydrogen sulphide gas to sulphuric acid. However the production of sulphuric acid from hydrogen sulphide is commercially limited due over production consequently resulting in low market price.

Some work has been done relating to conversion of sulphur dioxide ($SO_2$), such as from flue gasses in coal powered electricity generation, to sulphuric acid. There have also been efforts in developing processes for conversion of hydrogen sulphide ($H_2S$) to sulphuric acid by treatment with hydrogen peroxide, sodium sulphates and ferric sulphates, however these have proven to be costly and difficult to implement on a large, industrial scale. It is therefore desirable to find an economic and safe method of converting otherwise waste acid gas streams to valuable sulphuric acid, which can then further be used to produce fertilizer.

SUMMARY OF THE INVENTION

A method is provided for producing sulphate or phosphate-based fertilizer from an acid gas stream. The method comprises feeding the acid gas stream, containing at least 50% by volume hydrogen sulphide, and air to a furnace and burning the acid gas stream in the presence of air to produce a stream comprising sulphur dioxide, carbon dioxide, nitrogen, water vapour and oxygen. The sulphur dioxide stream is then fed to a reactor to produce a sulphuric acid stream, a gaseous waste stream and possibly a liquid waste stream and the sulphuric acid stream is converted to a phosphate-based or sulphate-based fertilizer.

A further method is provided for producing sulphate-based and phosphate-based fertilizers from waste acid gas, comprising feeding a sour natural gas stream comprising natural gas, other hydrocarbons and waste acid gas to a sweetening unit in which the acid gas is stripped from the natural gas and other hydrocarbons. The acid gas stream, containing at least 50% by volume hydrogen sulphide, is then fed with air to a furnace and burned to produce a stream comprising sulphur dioxide, carbon dioxide, nitrogen, water vapour and oxygen. Any other sulphur based compounds like mercaptans and carbonyl sulphides also get converted to sulphur dioxide without requiring any special techniques for treatment and separation. The sulphur dioxide stream is fed to a reactor to produce a sulphuric acid stream, a gaseous waste stream and possibly a liquid waste stream. Conversion of sulphur dioxide to sulphuric acid is a well known art and is widely practiced in the industry. However, in the present invention, this conversion takes place where the source of the sulphur dioxide is hydrogen sulphide from a waste or by-product stream, and the sulphuric acid thus produced is captively consumed and converted to a phosphate-based or sulphate-based fertilizer.

Thus, in one aspect, the invention may comprise a method for producing sulphate-based or phosphate-based fertilizers from waste acid gas. The method comprises feeding a sour natural gas stream comprising natural gas, other hydrocarbons and waste acid gas to a sweetening unit in which the acid gas is stripped from the natural gas and other hydrocarbons. The acid gas stream, containing at least 50% by volume hydrogen sulphide, is fed with air to a furnace and burned to produce a stream comprising sulphur dioxide, carbon dioxide, nitrogen, water vapour and oxygen. The hot sulphur dioxide stream is passed through a steam generator to produce steam. The cooled sulphur dioxide rich gas stream is then dehumidified if necessary to produce a dry, rich sulphur dioxide stream. The dehumidified and dried sulphur dioxide stream is fed to a reactor to produce a sulphuric acid stream. The sulphuric acid stream is then converted to a phosphate-based or sulphate-based fertilizer.

In another aspect, the invention may comprise a method for producing sulphate-based or phosphate-based fertilizers from an $H_2S$ byproduct stream from the gasification of coal or other low-value hydrocarbons. The method comprises feeding the $H_2S$ stream and air to a furnace where it is burned to produce a stream comprising sulphur dioxide, nitrogen, water vapour and oxygen. The gasification process may also produce ammonia, which may be used in the conversion of sulphuric acid to a fertilizer.

BRIEF DESCRIPTION OF THE DRAWINGS

The present invention is now described in greater detail with reference to the following drawings in, which.

DESCRIPTION OF THE INVENTION

Figure 1:
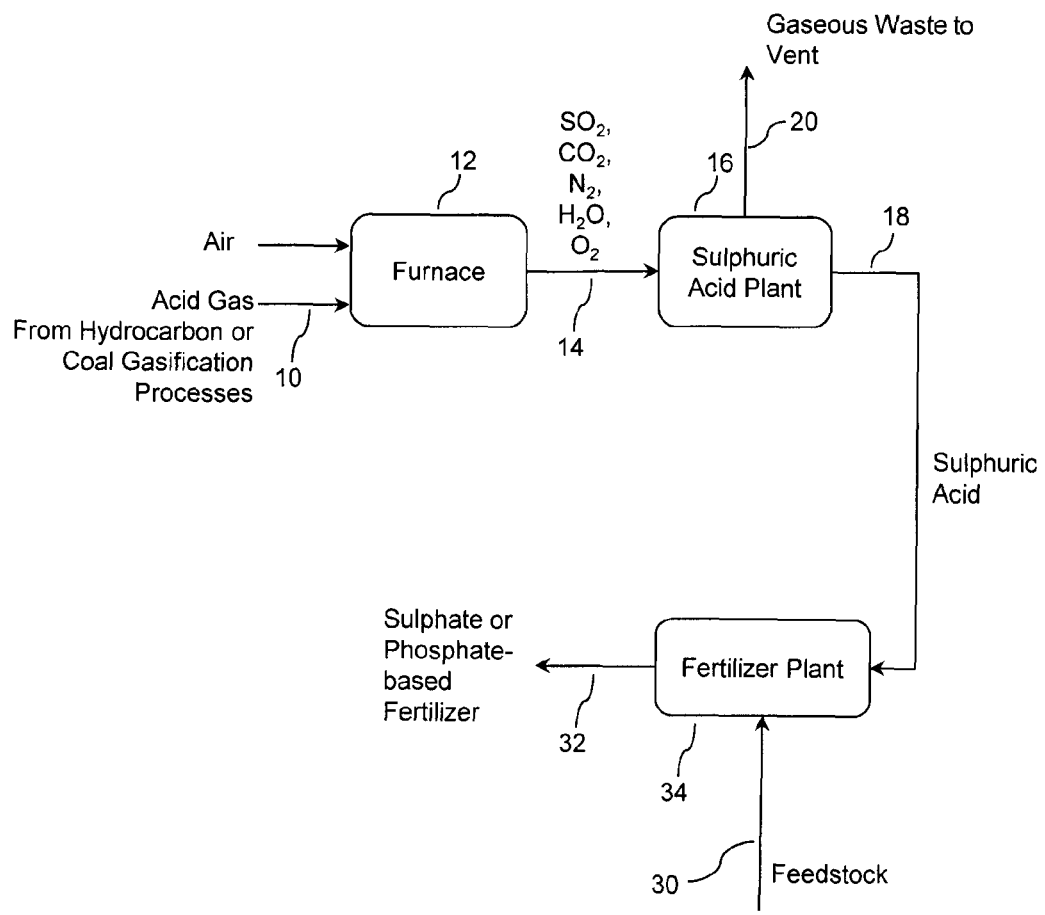
FIG. 1 is a schematic diagram of one embodiment of the process of the present invention.

The invention relates to a method for utilizing waste or by-product hydrogen sulphide to produce a fertilizer product. When describing the present invention, all terms not defined herein have their common art-recognized meanings. To the extent that the following description is of a specific embodiment or a particular use of the invention, it is intended to be illustrative only, and not limiting of the claimed invention.

In general terms, the present invention provides a method of producing a sulphate or a phosphate-based fertilizer from a waste or by-product stream comprising hydrogen sulphide, said method comprising:
a. creating a feedstock stream from the waste or by-product stream;
b. feeding the feedstock stream and air to a furnace;
c. burning the acid gas stream to produce a stream comprising sulphur dioxide;
d. feeding the sulphur dioxide stream to a reactor to produce a stream comprising sulphuric acid and a gaseous waste stream and
e. converting the sulphuric acid to a phosphate-based or sulphate-based fertilizer.

A waste or by-product stream is defined herein as a stream which is produced as a by-product of a process intended to produce another product, or which is considered to not to contain any product of economic value, or which is conventionally discarded in some manner. The waste or by-product stream may be an acid gas stream produced in a sour gas sweetening process or a coal gasification process.

Sour gas/acid gas feedstock for the process can come from acid gases recovered from natural gas or from processing petroleum mineral oil or from mineral ore processing, or from any other sources containing hydrogen sulphide gas. As used herein, an "acid gas" is a substance which is gaseous at standard temperature and pressure, and which forms an acid when dissolved in water. Hydrogen sulphide and carbon dioxide are both well known acid gases.

In another aspect, the invention may comprise a combined coal gasification and fertilizer production process, comprising the steps of:
a. Gasifying coal to produce syngas, hydrogen sulphide and ammonia;
b. separating and utilizing the hydrogen sulphide to produce sulphuric acid; and
c. separating and utilizing the ammonia to reacting the sulphuric acid to produce ammonium sulphate fertilizer.

A number of processes for conversion of hydrogen sulphide to sulphuric acid are possible and covered in the present invention. Particularly, it is possible to convert acid gas streams containing carbon dioxide and other contaminants, and hydrogen sulphide, without the need to pre-treat the acid gas stream to lower carbon dioxide content. The economics of the process depend, in part, on the quantity of hydrogen sulphide available for conversion. In one embodiment, the proportion of hydrogen sulphide in a feedstock acid gas stream may be greater than about 25% by volume, preferably greater than about 30%, and more preferably greater than about 40%. In one embodiment, the feedstock stream comprises 50% or more hydrogen sulphide by volume.

In one embodiment, the feedstock acid gas stream may comprise up to about 50% carbon dioxide. The carbon dioxide, whether present in excess or not, can be selectively separated from hydrogen sulphide in the feedstock stream and sold where markets for carbon dioxide exist.

One embodiment of the present invention is illustrated schematically in FIG. 1, in which a feedstock acid gas stream (10), comprising carbon dioxide and/or other contaminants and hydrogen sulphide, is fed with air to a furnace (12), where the hydrogen sulphide is combusted to produce sulphur dioxide, as well as nitrogen, water vapour and oxygen. Carbon dioxide passes through the furnace unconverted. Other sulphur compounds which may be present in minor quantities in the acid gas fraction, such as mercaptans and carbonyl sulphides, also combust to form sulphur dioxide.

The sulphur dioxide rich stream (14) is then reacted in a sulphuric acid plant (16) to form sulphuric acid (18) using conventional and well-known techniques. A gaseous waste stream (20) may also be produced comprising carbon dioxide, nitrogen and minor quantities of unreacted sulphur dioxide, and may be vented to the atmosphere. A liquid waste stream may also be generated, and if so, may comprise primarily dilute sulphurous acid. The liquid waste stream may be either disposed of using known means, or it can be neutralized with ammonia to form a nitrogen and sulphur-based liquid fertilizer with potential commercial value. The sulphuric acid (18) is then converted into a sulphate-based or phosphate-based fertilizer (32) in a fertilizer plant (34).

In one embodiment, a sulphate-based fertilizer is produced by contacting the sulphuric acid stream (18) with a nitrogen source as a feedstock (30). Preferably, the nitrogen source comprises ammonia, and the resulting fertilizer is an ammonium sulphate fertilizer.

Alternatively, the sulphuric acid stream may be contacted with one or more of any number of known feedstocks (30) to form a variety of phosphate or sulphate-based fertilizers. For example, sulphuric acid can be contacted with a phosphate source such as but not limited to phosphate-containing rocks and minerals. Sulphuric acid can also be contacted with a potassium source such as a potassium salt, muriate of potash (potassium chloride) or potassium oxide.

The source of nitrogen, source of phosphate and a source of potassium may be used alone or in any combination.

In one embodiment, sulphuric acid can be reacted with a carbon source and then ammonia to produce a carbon ammonium sulphate fertilizer. An example of such a process and the resulting fertilizer is illustrated in applicant's co-owned PCT Application WO200802246, the entire contents of which are incorporated herein, where permitted. A solid composition of a porous carbon matrix impregnated with a mineral acid, preferably sulphuric acid, may be used to chemisorb ammonia. In one embodiment, the acid-impregnated carbon matrix may be formed by applying sulphuric acid to carbonaceous biomass material while mixing both components. The carbonaceous biomass material may be dried beforehand to a suitable moisture content, and/or ground to a suitable particle size range. The biomass material is converted to a highly porous carbon matrix with impregnated sulfuric acid. This porous material may then be used to chemisorb ammonia. In one aspect, the carbon matrix impregnated with the mineral acid is fed to a reactor and an ammonia-containing gas is allowed to flow through the reactor. The ammonia reacts with the sulphuric acid to produce ammonium sulphate impregnated in the porous carbon matrix, referred to herein as "carbon ammonium sulphate". The carbon ammonium sulphate may then be granulated and screened to a desired particle size range, or pelletized in a pellet mill to achieve a desired particle size range.

The carbonaceous biomass material can include biomass such as wood, peat, straw, amongst other carbon sources well known in the art and are covered in the scope of the present invention.

In one embodiment, micronutrients may also be added at the time of converting sulphuric acid to a sulphate or phosphate-based fertilizer. Suitable micronutrients are well known in the art and include, but are not limited to, manganese, zinc, copper, selenium, magnesium, boron, and molybdenum. Micronutrients may be added alone or together with one or more of a nitrogen source, phosphate source, potassium source or a carbon source.

In another embodiment, sulphuric acid produced in any of the processes described herein can be reacted with oxide based micronutrients to produce sulphate based micronutrients which are incorporated into the fertilizer product. Sulphate based micronutrients may show greater plant availability than the oxide based micronutrients. Oxide based micronutrients can include, but are not limited to, metallic oxides such as iron oxide, magnesium oxide and zinc oxide.

A number of additives may also be added to the phosphate or sulphate based fertilizer. Suitable additives include, but are not limited to dispersal agents, agglomeration agents, coating agents, agents to increase crush strength, protect against humidity, dust control agents and granulation protection agents.

Figure 2:
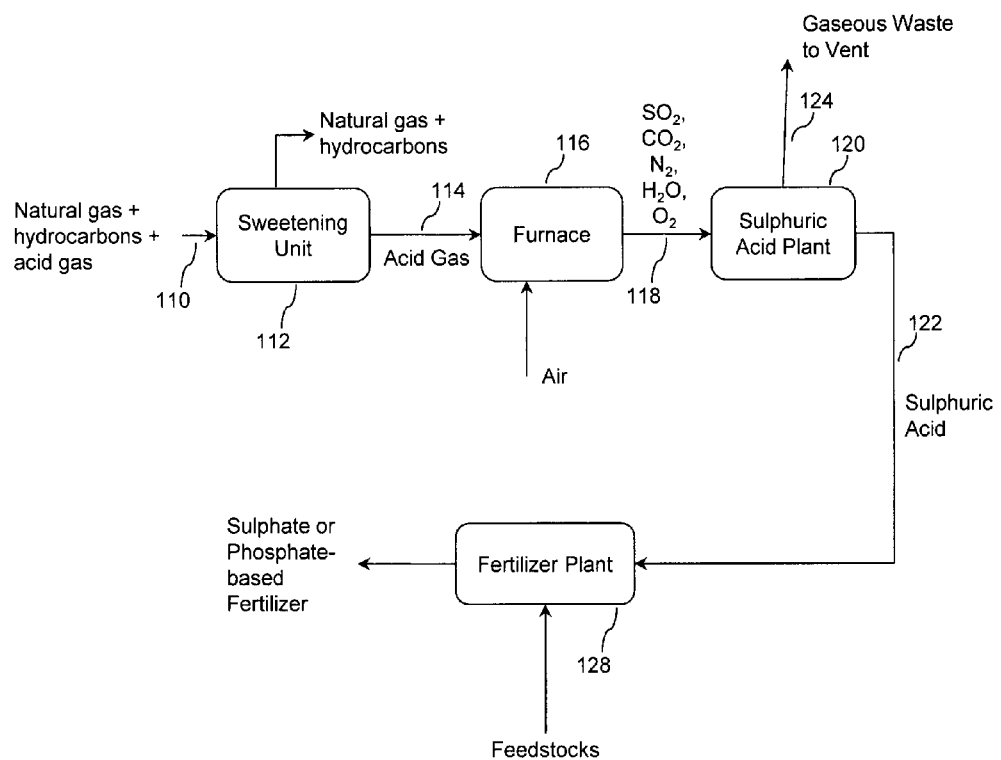
FIG. 2 is a schematic diagram of a second embodiment of the process of the present invention.

In another embodiment of the present invention, schematically illustrated in FIG. 2, the process includes a sour gas sweetening process. In this embodiment, sour natural gas (110) is fed to a sweetening unit (112) where acid gas (114) is stripped from natural gas and other hydrocarbons. Acid gas (114) is then fed to a furnace (116) together with air, where hydrogen sulphide in the acid gas stream is combusted to produce a sulphur dioxide rich stream (118), which also comprises nitrogen, water vapour and oxygen. Carbon dioxide passes through the furnace unconverted. Other sulphur compounds present in minor quantities in the acid gas fraction such as mercaptans and carbonyl sulphides also combust to form sulphur dioxide.

The sulphur dioxide rich stream (118) is then reacted in a sulphuric acid plant (120) to form sulphuric acid (122). A gaseous waste stream (124) is also produced comprising carbon dioxide, nitrogen and minor quantities of unreacted sulphur dioxide, and which may be vented to the atmosphere. A liquid waste stream may be produced, and if so, will comprise primarily dilute acid. The liquid waste stream may either be disposed of using known means, or can be neutralized with ammonia to form a nitrogen and sulphur-based liquid fertilizer with potential commercial value. The sulphuric acid (122) is then fed to a fertilizer plant (128) where it is converted to a sulphate or phosphate-based fertilizer.

In one embodiment, the sulphuric acid (122) is reacted with a nitrogen source such as ammonia to produce an ammonium sulphate fertilizer. In a preferred embodiment, the sulphuric acid is first used to create a porous carbon matrix from a biomass material and then used to chemisorb ammonia to produce carbon ammonium sulphate, as described above.

Various methods of sour gas sweetening are well known to those skilled in the art and encompassed by the present invention. In one embodiment, the process comprises an amine unit where sour natural gas is contacted with an amine. Such amines are well known in the art and can include for example monoethanolamine (MEA), diethanolamine (DEA), methyldiethanolamine (MDEA) and diisopropylamine (DIPA). Amines are known to absorb acid gases, thereby sweetening the natural gas and other hydrocarbons for commercial use. The amine and absorbed acid gas is then fed to a desorption unit where amine is stripped from the acid gas and recycled back to the amine unit. However, it would be clearly understood by a person skilled in the art that common variations to the amine unit and desorption unit, as well as a variety of non-amine based sweetening processes may also be suitable, and are encompassed in embodiments of the present invention. Such sweetening processes are typically conducted at a centralized facility, to which the sour natural gas must be transported.

In an alternative embodiment, it is also possible to recover acid gas fractions from sour natural gas remotely at the sour gas wellsite. The process, as described in applicant's co-owned Canadian Patent Application No. 2,683,983, which is incorporated herein by reference in its entirety, where permitted, can be adopted in place of conventional amine units and is also encompassed in embodiments of the present invention.

Figure 3:
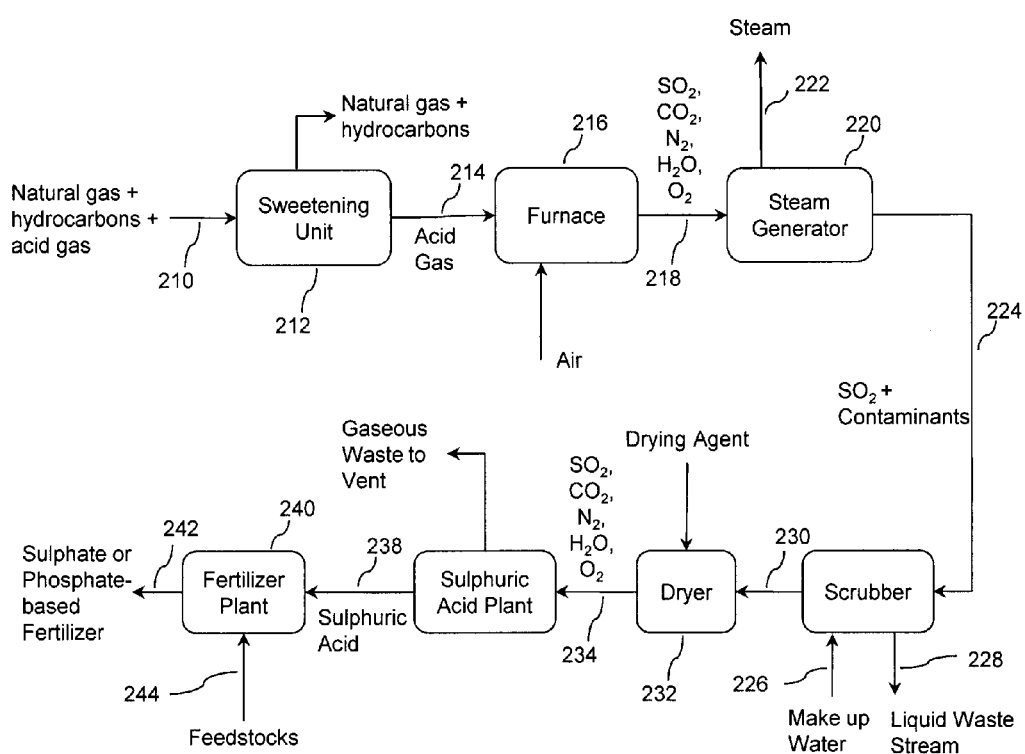
FIG. 3 is a schematic diagram of a third embodiment of the process of the present invention.

Another alternative embodiment is schematically illustrated in FIG. 3. In this process, a sour natural gas stream (210) comprising natural gas and other hydrocarbons and waste acid gas is fed to a sweetening unit (212) in which acid gas (214) is stripped from the natural gas and other hydrocarbons. The acid gas stream (214), which preferably comprises at least 50% by volume hydrogen sulphide, is fed together with air to a furnace (216). The acid gas is combusted in the presence of air to produce a sulphur dioxide rich stream (218), which also comprises nitrogen, water vapour and oxygen. Carbon dioxide passes through the furnace unconverted. Other sulphur compounds present in minor quantities in the acid gas fraction such as mercaptans and carbonyl sulphides also get combusted to form sulphur dioxide.

The hot sulphur dioxide rich stream (218) may then pass through a steam generator (220) to generate steam from the heat of combustion. In one alternative, steam (222) generated from the steam generator (220) can then be used in the generation of electricity. The sulphur dioxide rich gas stream (218) may be partly dehumidified by condensation as it gives up heat in the steam generator. The cooled sulphur dioxide rich stream (224) may then be scrubbed with makeup water (226), generating a liquid waste stream (228) comprising primarily dilute acid that can be neutralized with ammonia to form a nitrogen and sulphur-based liquid fertilizer with potential commercial value, or concentrated using other methods. The scrubbed stream (230) may then be dehumidified in a dryer unit (232) to produce a dry, rich sulphur dioxide stream (234) Suitable drying agents well known in the art, such as a molecular sieve or other hydroscopic material. In one embodiment, sulphuric acid from the sulphuric acid plant (236) may be used as the drying agent, resulting in a dilute sulphuric acid exiting the drying unit (232).

The dehumidified and scrubbed sulphur dioxide stream (234) is fed to a sulphuric acid plant (236) in which it undergoes conversion by an absorption process, as is well known in the art. The product of this reaction is sulphuric acid (238). A vapour waste stream may also be produced comprising carbon dioxide, nitrogen and trace quantities of unreacted sulphur dioxide, which may be vented to the atmosphere.

The sulphuric acid stream (238) is finally converted to a sulphate or phosphate-based fertilizer (242) in a fertilizer plant (240). In one embodiment, a nitrogen source (244) such as ammonia is reacted with the sulphuric acid to form an ammonium sulphate fertilizer. In a preferred embodiment, the sulphuric acid is first used to create a porous carbon matrix from a biomass material and then used to chemisorb ammonia to produce carbon ammonium sulphate, as described above.

In an alternate embodiment, sulphuric acid produced from any of the processes described above and illustrated in any of FIGS. 1 to 3 can also be reacted with a phosphate source such as phosphate-containing rocks to produce phosphoric acid and calcium sulphate. The phosphoric acid can in turn be converted to a phosphate based fertilizer. The calcium sulphate, which is stable and relatively safe, can be disposed of by known means in the art.

In another embodiment, sulphuric acid produced in any of the processes described above can be reacted with potassium chloride to produce potassium sulphate and a weak hydrochloric acid. Potassium sulphate is a well known and useful fertilizer product.

This detailed description of the compositions and methods is used to illustrate certain embodiments of the present invention. It will be apparent to a person skilled in the art that various modifications can be made in the present composition and methods and that various alternate embodiments can be utilized without departing from the scope of the present application, which is limited only by the appended claims.

We claim:

1. A method of producing a sulphate or a phosphate-based fertilizer from a feedstock stream comprising hydrogen sulphide in a proportion greater than about 25% by volume and carbon dioxide in an amount no more than about 50% by volume, said method comprising:
   a. combusting the feedstock stream in a furnace to produce a stream comprising sulphur dioxide and carbon dioxide;
   b. feeding the sulphur dioxide stream to a reactor to produce a stream comprising sulphuric acid and a gaseous waste stream comprising carbon dioxide; and
   c. reacting the sulphuric acid with a potassium source or a phosphate source to convert the sulphuric acid to a phosphate-based or sulphate-based fertilizer.

2. The method of claim 1 wherein the feedstock stream comprises a waste or by-product stream produced in a sour gas sweetening process or a coal gasification process.

3. The method of claim 1, wherein the phosphate source comprises a phosphate-containing rock or mineral.

4. The method of claim 1, wherein the potassium source comprises a potassium salt, a muriate of potash, or potassium oxide.

5. The method of claim 1, wherein one or more micronutrients are added at the time of converting sulphuric acid to a sulphate-based fertilizer, wherein the one or more micronutrients comprises manganese, zinc, copper, selenium, magnesium, boron or molybdenum.

6. The method of claim 1, wherein one or more additives are added to the phosphate or sulphate based fertilizer, wherein the one or more additives are selected from the group consisting of dispersal agents, agglomeration agents, coating agents, agents to increase crush strength, agents to protect against humidity, dust control agents and granulation aiding agents.

7. The method of claim 1, wherein the sulphuric acid stream of step (c) is reacted with the phosphate source to form phosphoric acid, and the phosphoric acid converted to a phosphate-based fertilizer and calcium sulphate.

8. The method of claim 1, wherein the phosphate source is phosphate-containing rock.

9. The method of claim 1, wherein a portion of sulphuric acid stream of step (c) is reacted with one or more oxide based micronutrients to produce one or more sulphate-based micronutrients which are incorporated into the fertilizer, wherein the one or more oxide based micronutrients comprises iron oxide, magnesium oxide or zinc oxide.

10. The method of claim 1, wherein the sulphuric acid stream of step (c) is reacted with potassium chloride as the potassium source to produce potassium sulphate and a weak acidic by-product.

11. The method of claim 1 comprising the further steps of:
   a, passing the sulphur dioxide stream through a steam generator to produce steam and a cooled sulphur dioxide stream;
   b. scrubbing and dehumidifying the cooled sulphur dioxide stream to produce a dry, rich sulphur dioxide stream; and
   c. feeding the dehumidified and scrubbed sulphur dioxide stream to a reactor to produce the sulphuric acid stream.

12. The method of claim 11, wherein steam generated from the steam generator is used in the generation of electricity.

13. The method of claim 1 wherein the feedstock stream is stripped from a natural gas stream and comprises at least 50% hydrogen sulphide by volume.

* * * * *